United States Patent

Batista

[15] 3,703,032
[45] Nov. 21, 1972

[54] DIFFUSION BONDING PROCESS
[72] Inventor: Roy I. Batista, Palos Verdes Estates, Calif.
[73] Assignee: TRW Inc., Redondo Beach, Calif.
[22] Filed: Aug. 14, 1970
[21] Appl. No.: 63,705

[52] U.S. Cl. ....................29/493, 29/497.5, 29/498
[51] Int. Cl. ..........................B23k 5/22, B23k 31/02
[58] Field of Search.....................29/497.5, 493, 498

[56] References Cited

UNITED STATES PATENTS

| 1,840,724 | 1/1932 | Koehring.................29/493 X |
| 3,184,362 | 5/1965 | Litsky et al. ............29/493 X |
| 3,352,004 | 11/1967 | Baque et al...........29/497.5 X |
| 3,535,767 | 10/1970 | Doherty, Jr. et al..29/497.5 X |
| 3,550,254 | 12/1970 | Greenspan et al....39/497.5 X |
| 2,850,798 | 9/1958 | Bowman et al..........29/498 X |

OTHER PUBLICATIONS

Garrett et al., Broad Applications of Diffusion Bonding, NASA CR-409, 1966, pp. XI, 73-78.

*Primary Examiner*—J. Spencer Overholser
*Assistant Examiner*—Ronald J. Shore
*Attorney*—Daniel T. Anderson, Alan D. Akers and James V. Tura

[57] ABSTRACT

A diffusion bonding process may be performed by heating a joint of two metal tubes in tight restriction. The difference in the coefficient of thermal expansion between the metal tubes and a retaining sleeve and wedge causes radial pressure which diffusion bonds the tubes at the joint.

6 Claims, 1 Drawing Figure

PATENTED NOV 21 1972 3,703,032
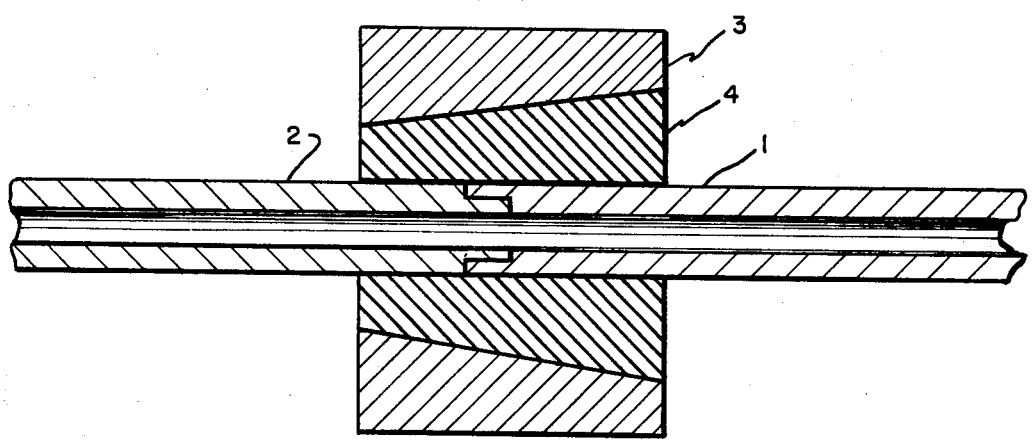
Roy I. Batista
*INVENTOR.*

DIFFUSION BONDING PROCESS

Bonding of metal tubing has posed many problems for metal fabricators. Several of these problems have been compounded where the metals to be bonded were dissimilar. Non-mechanical bonding of dissimilar metals is frequently a difficult task where welding or brazing is used. With welding or brazing, little difficulty would be expected when joining metal systems which form a continuous series of solid solutions; however, considerable difficulty would be expected in systems having little or no mutual solubility. For example, titanium and stainless steel fall between these two extremes in that intermetallic compounds are formed between the titanium and the iron and the nickel in the stainless steel. These intermetallic compounds are hard and brittle thereby reducing the structural properties of the joint, and where fusion welding is used, gross cracking occurs in the heat affected zone. To achieve a successful stainless steel-titanium joint, it would be necessary to control or limit the formation of intermetallic compounds. Thus, while fusion welding is not entirely impractical, it would require an extensive effort to develop a suitable filler wire.

Brazing dissimilar metal joints requires selection of alloys compatible with the metals to be joined and with the operational environment. In several instances, such as with stainless steel-titanium joints, there are no brazing alloys that will adequately meet the requirements and thus an alloy would have to be developed to fully exploit brazing as a method of joining the metals.

A superior apparatus and method have been discovered whereby two dissimilar metal tubes may be joined by diffusion bonding. When heat is applied to a joint of two tubes enclosed in an annular reinforcing sleeve and wedge, radial pressure is exerted against the sleeve and wedge by the differential thermal expansion between the tube joint and the sleeve and wedge to produce a diffusion bond of the tubes. Heating may be conducted in a furnace or by induction heating.

A better understanding of the invention may be achieved by reference to the drawing which shows a cross-sectional view of the apparatus and work-piece.

In the drawing, two tubes 1 and 2 are machined to form a simple overlap joint. Reinforcing sleeve 3 and wedge 4 are positioned over the tube joint to provide a close fit on all sides of the tube joint. The inner surface of cylindrical sleeve 3 is tapered to match the outer surface of wedge 4. To permit easier assembly, wedge 4 may be split into two equal sections.

Materials from which reinforcing sleeve 3 is made must be selected from structural materials which can withstand high temperatures and which have a low coefficient of expansion. Specific examples of a few of the suitable materials are tungsten, molybdenum, silica, alumina, silicon carbide, and chromium. When in-place diffusion bonding is required, reinforcing sleeve 3 may be split and secured with a bolt and flange or similar arrangement.

Wedge 4 may be made from the same materials as sleeve 3 or from materials having a higher coefficient of thermal expansion. Specific examples of a few of the suitable materials are aluminum, steel, magnesium, copper, and various alloys thereof. While wedge 4 may have single unitary construction, it is preferred that wedge 4 be split into two equal sections to facilitate the assembly and disassembly of the tool. When the tool is assembled and wedge 4 is firmly in place, all sides of the tube joint are securely held and any radial pressure caused by tube expansion is opposed uniformly by wedge 4 and sleeve 3.

Where added radial pressure is necessary to bond the joint, a mandrel may be inserted in the tubes and positioned at the joint. It is preferred that the material from which the mandrel is made be selected from the same material as wedge 4. Although the mandrel may be a solid unitary piece, assembly and disassembly is made easier if the mandrel is split or collapsible.

The tube joints may be made according to several methods. The simplest and the preferred type of joint is an overlapping step joint as shown in the drawing. If brittle intermetallic compounds form at the joint, metals foreign to either tube or metal hydrides may be applied as a diffusion barrier to the joint by plating, vapor deposition, spraying, or inserting a foil in the joint area. In a similar manner, intermediate metal may be selected to enhance diffusion and thus accelerate the bonding cycle. These techniques are known in the art and will not be belabored here inasmuch as many parameters must be considered in each case before selecting the interface material.

The following table illustrates the quality of bonds which may be expected using the process and apparatus of this invention. Test specimens of stainless steel tubes of 0.5 inch diameter, 0.042 inch wall, and titanium tubes of 0.5 inch diameter, 0.020 inch wall were used.

TABLE

| | |
|---|---|
| Ultimate Strength | 70,000 psi |
| Burst Strength (Titanium tube failed) | 6,800 psig |
| Helium Leak at 50 psig | $4 \times 10^{-11}$ cc/sec |
| after 4,500 psig proof test | $6 \times 10^{-11}$ cc/sec |

Six specimens were given stress reversal tests ranging from a stress level of 10,000 psi at 5 million cycles to a stress level of 12,500 psi at 7.8 million cycles without failure.

I claim:

1. A diffusion bonding process for metal tubing comprising:
   a. two metal tubes having the surfaces to be joined machined so that the outside diameter of one is equal to the inside diameter of the other;
   b. joining the ends of the tubing;
   c. placing the tubing joint in a hollow cylindrical strength member having the inner surface tapered;
   d. inserting a split cylindrical wedge having the outer surface tapered to be received by said strength member thereby firmly enclosing the joint; and
   e. heating the assembly to a temperature below the melting temperature of the metal to affect bonding of the tubes.

2. A process according to claim 1 wherein the metal tubes are made from dissimilar metals.

3. A process according to claim 1 wherein an intermetallic compound inhibitor is applied to the tube surfaces to be joined.

4. A process according to claim 1 wherein a diffusion aid is applied to the tube surfaces to be joined.

5. A process according to claim 1 wherein a mandrel having a high coefficient of thermal expansion is inserted inside the metal tubes to be joined.

6. A process according to claim 1 wherein the split wedge has a coefficient of thermal expansion at least as high as the strength member.

* * * * *